E. R. DRAVER.
COMBINED TIRE CARRIER AND COVER.
APPLICATION FILED MAR. 16, 1916.
1,211,377.
Patented Jan. 2, 1917.
2 SHEETS—SHEET 2.
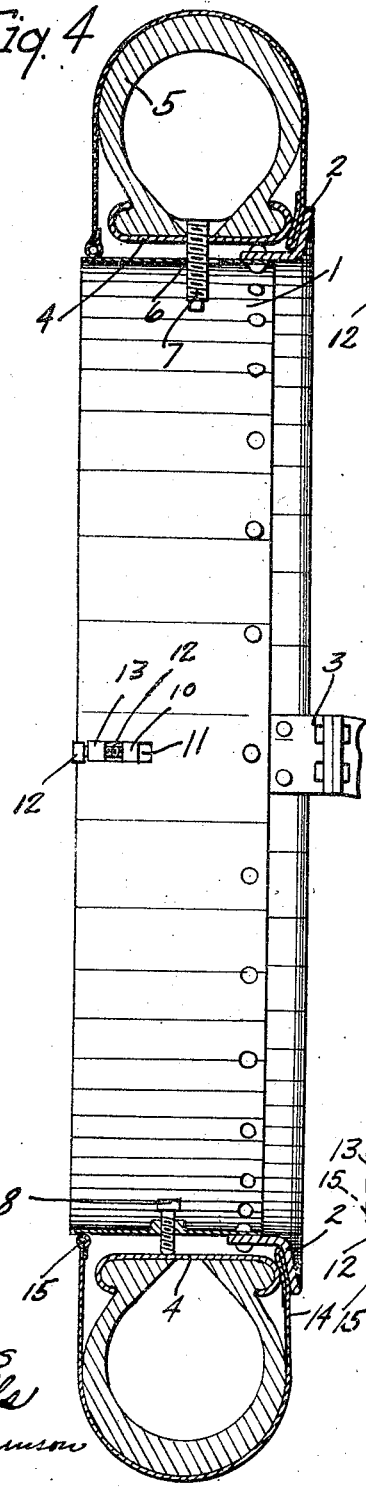
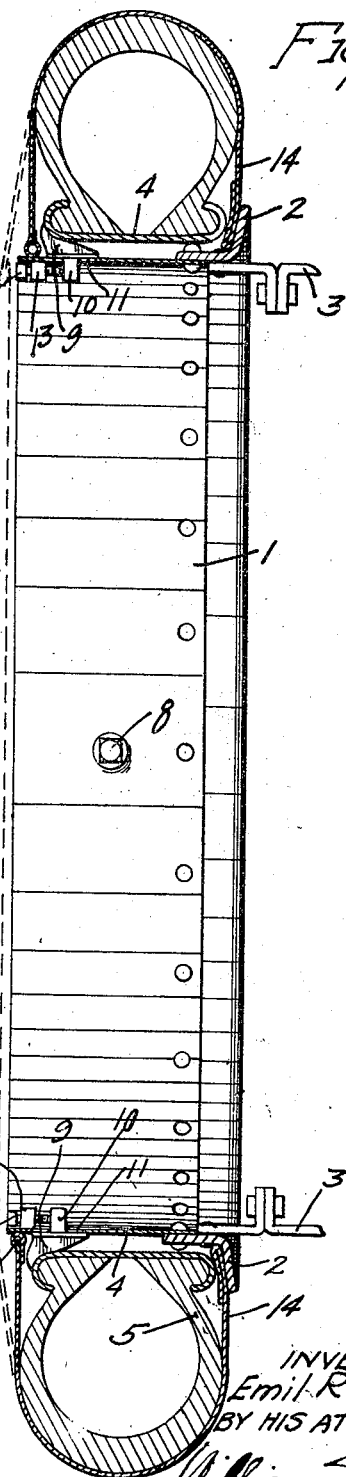
WITNESSES
E. C. Wells
G. F. Williamson
INVENTOR
Emil R. Draver
BY HIS ATTORNEYS
Williamson Murchad

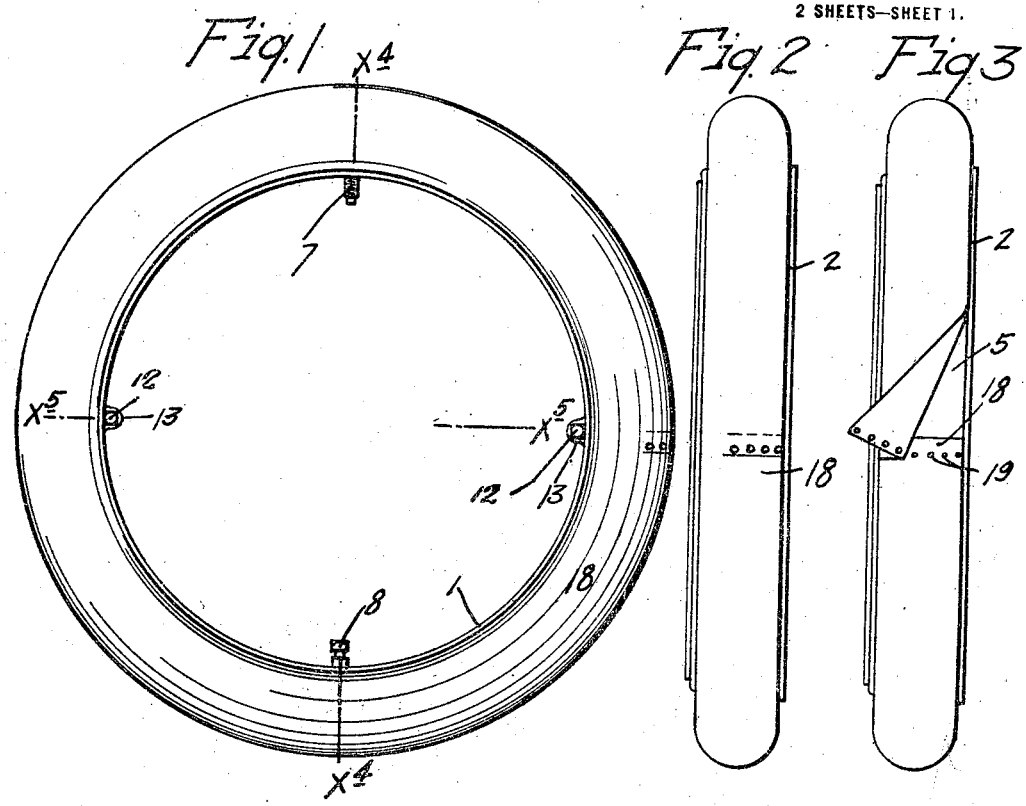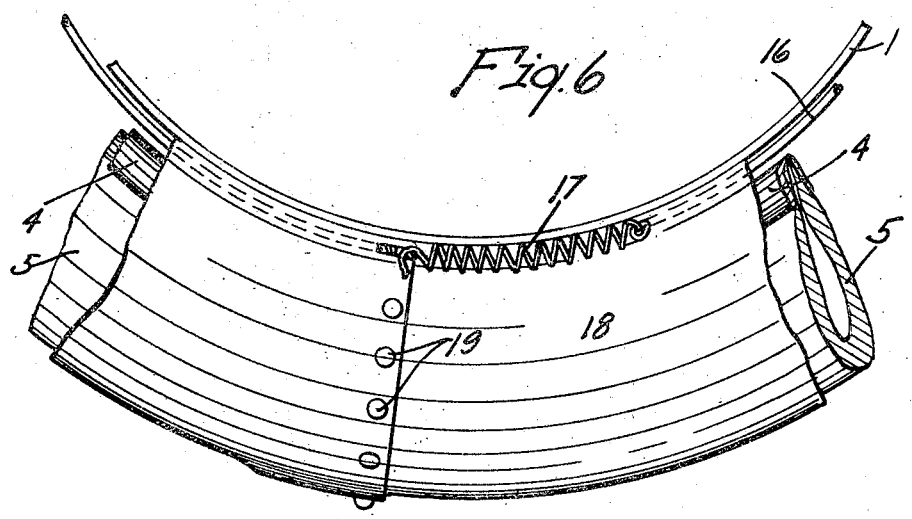

UNITED STATES PATENT OFFICE.

EMIL R. DRAVER, OF RICHMOND, INDIANA.

COMBINED TIRE CARRIER AND COVER.

1,211,377.   Specification of Letters Patent.   Patented Jan. 2, 1917.

Application filed March 16, 1916. Serial No. 84,572.

*To all whom it may concern:*

Be it known that I, EMIL R. DRAVER, a citizen of the United States, residing at Richmond, in the county of Wayne and State of Indiana, have invented certain new and useful Improvements in Combined Tire Carriers and Covers; and I do hereby declare the following to be a full, clear, and exact description of the invention, such as will enable others skilled in the art to which it appertains to make and use the same.

My present invention has for its object to provide an improved tire carrier and cover, and is in the nature of an improvement on or modification of the combined tire carriers and covers disclosed and claimed in my pending applications 39,145, filed July 10, 1915, and 75,301, filed January 31, 1916.

Generally stated, the invention consists of the novel construction and combination of parts illustrated, described and defined in the claims.

In the accompanying drawings which illustrate the invention, like characters indicate like parts throughout the several views.

Referring to the drawings: Figure 1 is a side elevation showing the combined carrier and cover applied over a tire and demountable rim; Figs. 2 and 3 are plan views of the parts shown in Fig. 1; Fig. 4 is an enlarged section taken on the line $x^4$ $x^4$ of Fig. 1; Fig. 5 is an enlarged horizontal section taken on the line $x^5$ $x^5$ of Fig. 1; and Fig. 6 is a fragmentary view in side elevation on a large scale, illustrating a modification of certain of the parts.

Referring first to the construction illustrated in Figs. 1 to 4, inclusive, the numeral 1 indicates a carrier hoop shown as provided at its inner edge with an outstanding flange 2 and provided further with anchor brackets 3, by means of which it may be secured to the body or other part of an automobile. The extra demountable rim 4 is adapted to be freely telescoped over the carrying hoop 1, while the tire 5 is attached thereto. At its top, the hoop 1 is provided with a suitable passage 6 through which the charging nipple 7 of the tire is adapted to be freely passed. At its lower portion, the carrying hoop 1 is provided with a set screw 8 that is adapted to be screwed against the lower inner surface of the demountable rim 4. In some instances, the charging nipple 7 and set screw 8 may be found sufficient to hold the demountable rim on the carrying hoop, but preferably I provide auxiliary or additional clamping devices. These clamping devices, as shown, are in the form of wedge lugs 9 that slide upon the outer surface of the hoop 4 and engage with the outer edge surface of the demountable rim, so that when forced inward or toward the clamping flange 2, they will securely hold the said demountable rim on the main hoop. These wedge lugs have projecting ears 10 that work through slots 11 in the carrying hoop, which slots are preferably located horizontally opposite, in respect to the axis of the carrying hoop. Set screws 12 work through lugs 13 on the carrying hoop 1, and impinge against the ears 10 to force the wedge lugs inward or into action. The slots 11 are of such length and the wedge lugs are of such construction that they can be removed when the demountable rim is forced toward the flange 2 and the set screws 12 are screwed outward.

The tire cover 14 is of a flexible or pliable material, such, for example, as waterproofed cloth or fabric. Hems are formed in the edges of this cover and in the outer hem thereof, is placed an endless elastic clamping band 15. This endless clamping band may take different forms. For example, it may be an endless coiled spring, as employed in the construction illustrated in Figs. 1 to 5, inclusive, or it may be a wire or cable 16, the ends of which are connected by a coiled spring 17, as shown in Fig. 6. The outer hem of the said cover is capable of circumferential expansion and contraction, so that it may be clamped by its elastic band upon the outer edge portion of the carrying hoop 1. The inner hem or edge portion of the flexible cover is arranged to be interposed and clamped between the clamping flange 2 of the carrying hoop 1, and the inner edge of the demountable rim 4.

To provide for easy application of the cover around the tire, and likewise, easy removal therefrom, it is provided at least in one place, with a transverse slit or division formed by flaps arranged to overlap at 18. This overlapping joint 18 extends from the extreme inner edge of the cover to a point transversely at least as far outward as the greatest diameter of the said cover and it may be extended considerably farther. The overlapping flaps are adapted to be connected by suitable fasteners, such as snap fasteners 19.

It is preferable to place the cover 14 over the tire and demountable rim before they are placed on the carrying hoop and to fasten down the flaps thereof at 18 by engagement of the snap buttons 19. Then the demountable rim and tire will be placed on the carrying hoop with the charging nipple 7 projecting through the nipple passage 9 thereof, and with the inner flap of the cover pressed between the clamping flange 2 and the adjacent edge of the demountable rim. The set screw 8 should then be tightened just enough to hold the rim in position. Then the wedge lugs 9, being placed in position and the set screws 12 tightened, the demountable rim may be forced toward the clamping flange 2 so that the inner edge of the cover will be tightly clamped in position between said flange and the adjacent edge of the rim 4. The outer fold of the cover and its elastic clamping band being then sprung over the outer edge of the carrying hoop, the tire and demountable rim will be closely incased. When this expansible outer hem of the cover is sprung off from the carrying hoop, as indicated by dotted lines in Fig. 5, the wedge lugs 9 can be applied in working position or removed therefrom. The said wedge lugs in the construction, must be applied after the tire and rim are telescoped around the carrying hoop and they must be removed before the said tire and rim can be detached from the carrying hoop. However, these wedge lugs, so-called, may be variously arranged.

What I claim is:

1. The combination with a carrying hoop having an outstanding clamping flange, of a demountable rim and tire applicable around said carrying hoop, rim holding means applied on said carrying hoop, and a flexible tire cover having its inner edge directly clamped between said clamping flange and the adjacent edge of said demountable rim, the outer edge of said cover being laterally spaced from the inner edge thereof and slipped over and engaged with said carrying hoop on a line outward of said rim holding means.

2. The combination with a carrying hoop having an outstanding clamping flange, of a demountable rim and tire applicable around said carrying hoop, and a flexible tire cover having its inner edge directly engaged between said clamping flange and the adjacent edge of said demountable rim, and means for holding said rim on said hoop in position to thus clamp the inner edge of said cover, the said cover having an elastic outer edge adapted to be sprung onto the outer portion of said hoop.

3. The combination with a carrying hoop, of a flexible tire cover provided with a continuous elastic outer edge and having a transversely split inner portion equipped with separable fasteners whereby it is adapted for application over a tire and onto a carrying hoop.

4. A flexible annular tire cover that is channel-shaped in cross section, having an elastic outer edge and having a transverse slit extended from the inner edge thereof, at least as far as the greatest diameter of said cover, and formed at the said slit with overlapping flaps equipped with fastening devices.

5. The combination with a carrying hoop, of a flexible tire cover provided with a continuous elastic outer edge and having a transversely split inner portion equipped with separable fasteners whereby it is adapted for application over a tire and onto a carrying hoop, in combination with a carrying hoop around which said cover is applicable, said hoop having a clamping flange for engagement with the inner edge portion of said cover, and means applied to said hoop for holding a demountable rim and tire thereon with the inner edge of said rim engaged with the inner edge portion of said cover.

6. A flexible annular tire cover that is channel-shaped in cross section, having an elastic outer edge and having a transverse slit extended from the inner edge thereof, at least as far as the greatest diameter of said cover, and formed at the said slit with overlapping flaps equipped with fastening devices, in combination with a carrying hoop around which said cover is applicable, said hoop having a clamping flange for engagement with the inner edge portion of said cover, and means applied to said hoop for holding a demountable rim and tire thereon with the inner edge of said rim engaged with the inner edge portion of said cover.

7. The combination with a carrying hoop having an outstanding clamping flange, of a demountable rim and tire applicable around said carrying hoop, rim holding means applied on said carrying hoop, and a flexible tire cover having its inner edge directly clamped between said clamping flange and the adjacent edge of said demountable rim, the outer edge of said cover being laterally spaced from the inner edge thereof, and anchored to said carrying hoop at the outer side of said tire.

In testimony whereof I affix my signature in presence of two witnesses.

EMIL R. DRAVER.

Witnesses:
ORIS. D. LEE,
FLORENCE DRAVER.